US011414020B2

(12) United States Patent
Daniels et al.

(10) Patent No.: US 11,414,020 B2
(45) Date of Patent: Aug. 16, 2022

(54) RETRACTABLE LOAD CARRIER SYSTEM FOR A VEHICLE

(71) Applicant: Ruck Manufacturing LLC, Kalamazoo, MI (US)

(72) Inventors: Aaron Daniels, Dover, NH (US); Michael Boyle, Kalamazoo, MI (US); Marc Scuiletti, Madison Heights, MI (US); Scott Daniels, Dover, NH (US)

(*) Notice: Subject to any disclaimer, the term of this patent is extended or adjusted under 35 U.S.C. 154(b) by 263 days.

(21) Appl. No.: 16/882,404

(22) Filed: May 22, 2020

(65) Prior Publication Data

US 2021/0138966 A1 May 13, 2021

Related U.S. Application Data

(60) Provisional application No. 62/851,429, filed on May 22, 2019.

(51) Int. Cl.
*B60R 9/042* (2006.01)
*B60R 9/048* (2006.01)

(52) U.S. Cl.
CPC .............. *B60R 9/042* (2013.01); *B60R 9/048* (2013.01)

(58) Field of Classification Search
CPC ................................ B60R 9/042; B60R 9/048
USPC ....... 224/310, 309, 315, 319, 321, 492, 484; 414/462
See application file for complete search history.

(56) References Cited

U.S. PATENT DOCUMENTS

| | | | | |
|---|---|---|---|---|
| 4,081,095 A * | 3/1978 | Wilburn | .................. | B60R 9/042 414/522 |
| 4,446,998 A * | 5/1984 | Taig | ........................ | B60R 9/042 224/310 |
| 5,544,796 A * | 8/1996 | Dubach | ................... | B60R 9/042 224/310 |
| 6,158,638 A * | 12/2000 | Szigeti | .................... | B60R 9/042 224/310 |
| 6,308,874 B1 * | 10/2001 | Kim | ........................ | B60R 9/042 224/310 |
| 6,338,427 B1 * | 1/2002 | Aftanas | ................... | B60R 9/045 224/310 |
| 6,516,984 B1 * | 2/2003 | Kmita | ..................... | B60R 9/042 224/310 |
| 6,679,407 B2 * | 1/2004 | Weeks | .................... | B60R 9/042 224/310 |

(Continued)

*Primary Examiner* — Nathan J Newhouse
*Assistant Examiner* — Lester L Vanterpool
(74) *Attorney, Agent, or Firm* — Gutwein Law; Tyler B. Droste

(57) ABSTRACT

A retractable load carrier system for a vehicle comprising a rail assembly comprising a first rail and a second rail, wherein each rail is configured to be mounted to a vehicle roof. The system can further include a rack assembly comprising a first support member and a second support member generally parallel to each other, wherein the first support member and second support member can be coupled together with at least one cross members, wherein the rack assembly has a first end and a second end, wherein both the first and second end can include a handle portion. A locking means can be coupled to the handle portion of the rack assembly, wherein the locking means comprises a plurality of engagement members configured to latch to engage the grooved portion of the rail assembly or the pins are configured to engage the pinion portion of the rail assembly.

20 Claims, 17 Drawing Sheets

(56) References Cited

U.S. PATENT DOCUMENTS

| | | | | |
|---|---|---|---|---|
| 6,681,970 | B2 * | 1/2004 | Byrnes | B60R 9/042 224/310 |
| 6,715,652 | B2 * | 4/2004 | Kmita | B60R 9/06 224/310 |
| 6,761,296 | B2 * | 7/2004 | Ford | B60R 9/055 224/310 |
| 6,766,928 | B2 * | 7/2004 | Aftanas | B60R 9/06 224/310 |
| 6,772,928 | B2 * | 8/2004 | Ford | B60R 3/005 224/310 |
| 6,827,244 | B1 * | 12/2004 | Stapleton | B60R 9/042 224/310 |
| 7,011,239 | B2 * | 3/2006 | Williams | B60R 9/042 224/310 |
| 7,108,162 | B2 * | 9/2006 | Stadler | B60R 9/042 224/310 |
| 7,226,266 | B2 * | 6/2007 | Henderson | B60R 9/042 414/466 |
| 7,410,082 | B2 * | 8/2008 | Stewart | B60R 9/10 224/512 |
| 7,780,050 | B2 * | 8/2010 | Tucker | B60R 9/042 224/310 |
| 8,267,292 | B2 | 9/2012 | Czornyj | |
| 8,414,168 | B2 | 4/2013 | Jutila | |
| 8,640,933 | B1 * | 2/2014 | McCray | B60R 9/042 224/325 |
| 9,193,305 | B2 * | 11/2015 | Kramer | B60R 9/042 |
| 9,290,130 | B2 | 3/2016 | Buller | |
| 9,457,727 | B2 * | 10/2016 | Hobbs | B60R 9/06 |
| 9,821,719 | B2 * | 11/2017 | Espig | B60R 9/042 |
| 10,189,417 | B1 * | 1/2019 | Morken | B60R 9/042 |
| 10,246,025 | B1 * | 4/2019 | Knigge | B60R 9/042 |
| 10,800,339 | B2 * | 10/2020 | Anderson | B60R 9/055 |
| 2002/0014504 | A1 * | 2/2002 | Hetu | B60R 9/042 224/310 |
| 2003/0052145 | A1 * | 3/2003 | Aftanas | B60R 9/042 224/310 |
| 2004/0028510 | A1 * | 2/2004 | Jones | B60R 9/042 414/462 |
| 2004/0173651 | A1 * | 9/2004 | Kim | B60R 9/042 224/310 |
| 2006/0065685 | A1 * | 3/2006 | Fitzsimmons | B60R 9/042 224/310 |
| 2007/0090139 | A1 * | 4/2007 | McKenzie | B60R 9/0423 224/310 |
| 2014/0069971 | A1 | 3/2014 | Van Kaathoven | |
| 2017/0113624 | A1 * | 4/2017 | Leff Yaffe | B60R 9/10 |
| 2017/0174115 | A1 * | 6/2017 | Frost | B60P 3/1025 |
| 2019/0126838 | A1 * | 5/2019 | Harrell | B60R 9/042 |

\* cited by examiner

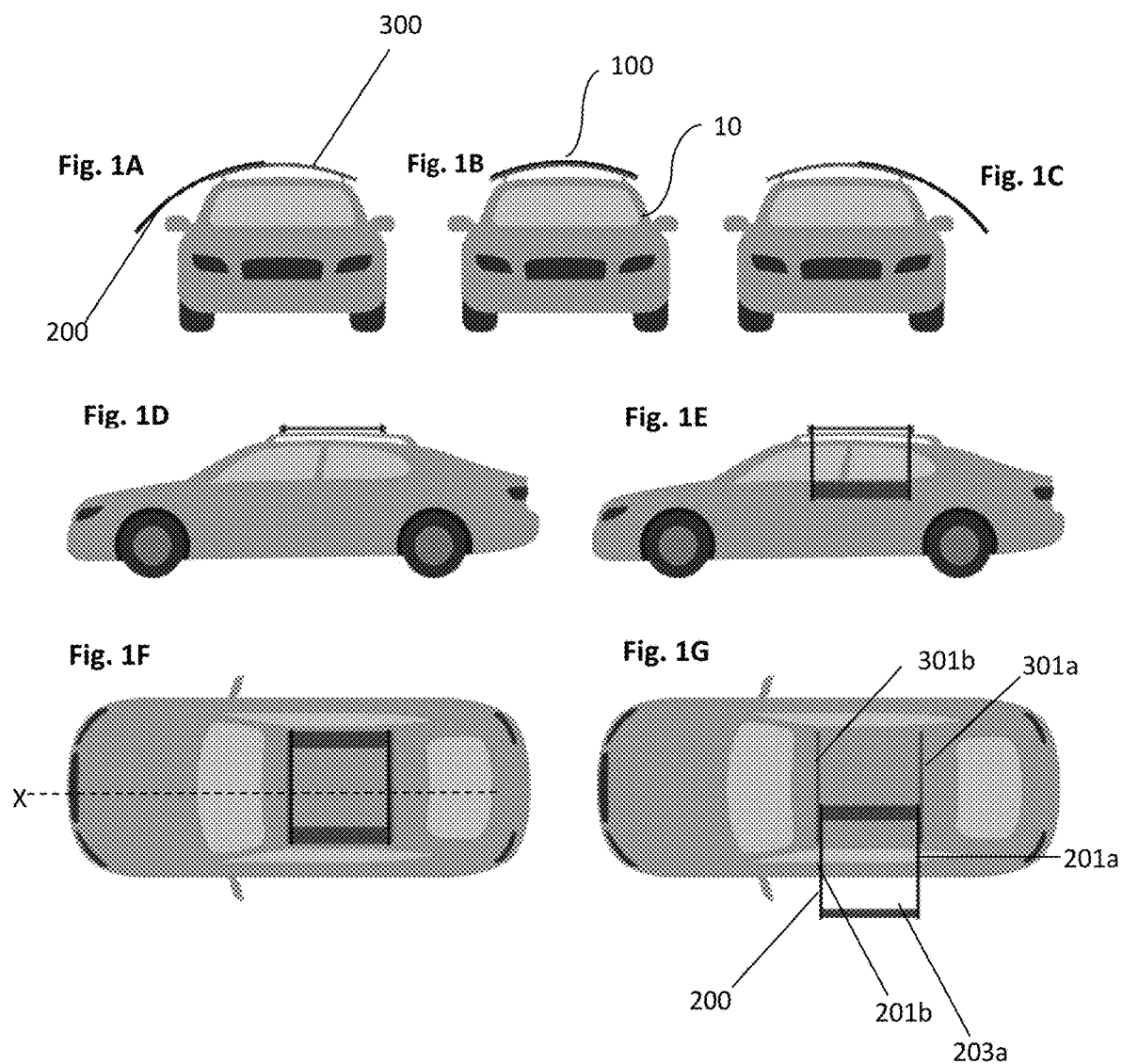

RETRACTABLE LOAD CARRIER SYSTEM FOR A VEHICLE

CROSS-REFERENCE TO RELATED APPLICATION

This U.S. Patent Application claims priority to U.S. Provisional Application: 62/851,429 filed May 22, 2019, the disclosure of which is considered part of the disclosure of this application and is hereby incorporated by reference in its entirety.

FIELD OF THE INVENTION

This invention generally relates to roof rack and load carrier for a vehicle, especially a low-profile system that allows a user to easily load and unload the rack system.

BACKGROUND

In the automotive industry, vehicles utilizing load carrier systems, such as roof-top carriers are very common for increasing the capacity of the items to be transported, as well as carrying larger cargo, such as kayaks, canoes, bicycles, and other equipment.

The disadvantage of conventional roof racks that are mountable on the roof is that the luggage or the roof box must be lifted onto the roof and fixed there. This is particularly difficult and arduous when the objects are heavy, bulky, and oversized. Roof racks have therefore been suggested with devices for making it easier to convey luggage or a load onto the roof. For example, German laid-open patent application DE 41 22 823 A1 and German utility model DE 200 02 018 U1 propose roof racks with a lifting device. The disadvantage of these movable roof racks is that they possess significant additional weight and take up additional space on the roof of a motor vehicle. The air resistance and fuel consumption are thereby increased.

In a similar manner, U.S. Pat. No. 5,154,563 and DE 44 21 030 C1 disclose movable roof racks where a track system is installed on the outside of the motor vehicle that runs down from the roof to the rear or side of the motor vehicle. Roof boxes or other containers can move along this track system. This yields significantly elevated air resistance and fuel consumption in this case as well. Furthermore, the luggage containers installed on the tracks are tilted while they move so that the pieces of luggage in the luggage containers get mixed up and/or can become damaged.

There exists a need for an apparatus and method that reduces the physical strength and effort required to load cargo onto a roof-top cargo rack or carrier.

BRIEF SUMMARY OF THE INVENTION

In one aspect, this disclosure is related to a moveable roof rack assembly to easily access and utilize cargo stored and placed on the rack without having to climb on top of the vehicle to secure or remove the cargo. The rack assembly can be bent in a curvature nature to allow the roof rack to move from a contracted position above the vehicle to an extended position that follows the curvature of the rails and is configured to extend in an outward and downwardly direction to be more easily accessible to a user.

In another aspect, this disclosure is related to a retractable load carrier system for a vehicle roof comprising a rail assembly comprising a first rail and a second rail, wherein each rail is configured to be mounted to a vehicle roof. Each rail of the rail assembly can include a grooved portion. The system can further include a rack assembly comprising a first support member and a second support member generally parallel to each other, wherein the first support member and second support member can be coupled together with at least one cross members, wherein the rack assembly has a first end and a second end, wherein both the first and second end can include a handle portion. A locking means can be coupled to the handle portion of the rack assembly, wherein the locking means comprises a plurality of latches, pins or other means, wherein the latches or pins are configured to latch to engage the grooved portion of the rail assembly.

In yet another aspect, this disclosure is related to A retractable load carrier apparatus for a vehicle roof having a rail system including a first rail and a second rail, wherein said rails are configured to be mounted to a vehicle roof. A rack assembly can removably coupled to the rail assembly and can include a first support member and second support member, wherein each support member has a first end and a second end and the first rail corresponds to the first support member and the second rail corresponds to the second support member. A first cross member can be coupled to the first and second support members at the first end of the support members and a second cross member coupled to the first and second support members ate the second end of the support members. A first handle assembly coupled to the first cross member, wherein the handle assembly can include a grip and a biasing means to maintain the grip in a first position. The rack assembly can also include a first locking assembly communicatively coupled to the first handle assembly, wherein the locking assembly is configured to be disengaged when pressure is applied to the grip and moved from the first position to a second position to allow the rack assembly to move from a first position to a second position.

In some embodiments, the rack assembly can further include a second handle assembly coupled to the second cross member, wherein the handle assembly comprises a second grip and a biasing means to maintain the grip in a first position. Additionally, a locking assembly can include a latch and a grooved member, wherein the latch engages with the grooved member when the grip is in the first position and disengages with the grooved member when the grip is in the second position.

Furthermore, the rack assembly can further include a first coordinating engagement cable having a first end and a second end, wherein the first end of the first coordinating engagement cable is couple to the grip of the second handle assembly and the second end is couple to the first locking assembly, wherein when the second grip is moved from the first position to the second position, the first locking assembly is configured to be disengaged to allow the rack to move from a first position to a second position.

Some exemplary embodiments of the present disclosure may include a second locking assembly communicatively coupled to the second handle assembly, wherein the locking assembly is configured to be disengaged when pressure is applied to the grip and moved from the first position to a second position to allow the rack assembly to move from a first position to a second position on the rails. Optionally, a second coordinating engagement cable having a first end and a second end can be included, wherein the first end of the second coordinating engagement cable is coupled to the grip of the first handle assembly and the second end is couple to the second locking assembly, wherein when the second grip is moved from the first position to the second position, the first locking assembly is configured to be disengaged to allow the rack to move from a first position to a second position.

Furthermore, one exemplary embodiment of the locking assembly can include a bar having a first end and a second end, wherein the bar is coupled to the grooved member, wherein the bar extends between the two support members of the rack assembly. The bar can include first spool member on the first end and a second spool member on the second end. Each spool member can house a cable having a first end and a second end, wherein the first end of the cable is coupled to the spool member and the second end of the cable is couple to the support member. In some embodiments, the bar can be put under a pre-determined amount of tension using a tensioning means, wherein the tension on the cable is configured to aid a user to move the rack assembly from a first position to a second position when a load is placed on the rack assembly.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein:

FIG. 1A is a perspective view of an exemplary embodiment of the retractable load carrier system of the present disclosure mounted on top of a vehicle with the carrier system deployed on a first side of the vehicle.

FIG. 1B is a perspective view of an exemplary embodiment of the retractable load carrier system of the present disclosure mounted on top of a vehicle with the carrier system undeployed on the top of a vehicle.

FIG. 1C is a perspective view of an exemplary embodiment of the retractable load carrier system of the present disclosure mounted on top of a vehicle with the carrier system deployed on a second side of the vehicle.

FIG. 1D is a side view of an exemplary embodiment of the retractable load carrier system of the present disclosure mounted on top of a vehicle with the carrier system undeployed on the top of a vehicle.

FIG. 1E is a side view of an exemplary embodiment of the retractable load carrier system of the present disclosure mounted on top of a vehicle with the carrier system deployed on a second side of a vehicle FIG. 1F is a top view of an exemplary embodiment of the retractable load carrier system of the present disclosure mounted on top of a vehicle with the carrier system deployed on a second side of a vehicle.

FIG. 1G is a top view of an exemplary embodiment of the retractable load carrier system of the present disclosure mounted on top of a vehicle with the carrier system undeployed on the top of a vehicle.

DETAILED DESCRIPTION OF THE INVENTION

Figure 2A:
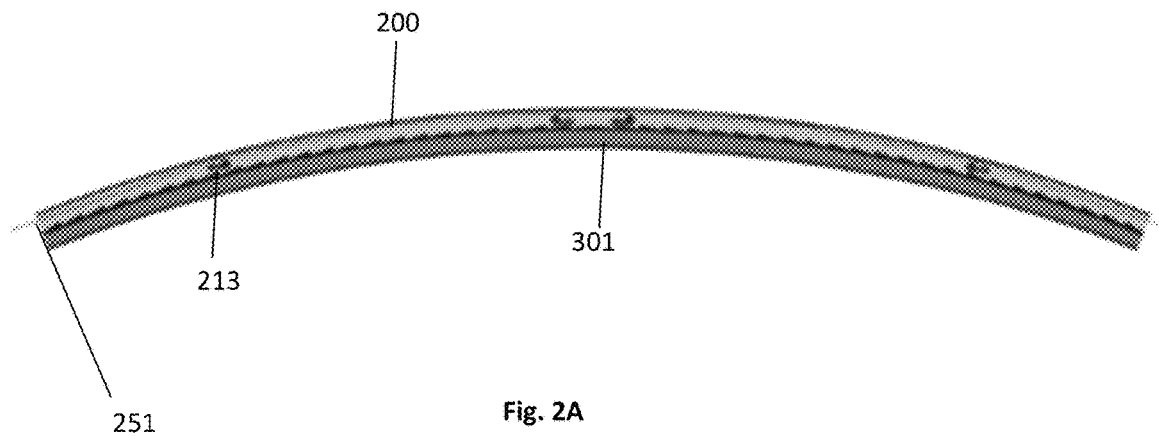
FIG. 2A a side view of an exemplary embodiment of a retractable load carrier system of the present disclosure with the rack portion in a contracted position.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

FIGS. 1A-G show a various views of a retractable load carrier 100 for use on a vehicle roof of the present disclosure. The retractable load carrier 100 can include a rack assembly 200 and a rail assembly 300. The full rack can be fully assembled in any suitable manner such as using coupling means or welded together as a singular component. Alternatively, the rack assembly 200 can be comprised of various components and using any suitable coupling means, such as fasteners to allow a user to break down, thereby reducing the rack size for storage. In some embodiments, the rack assembly 200 can include one or more hinges to allow the rack to be folded when detached from the rail system. The hinges can allow the rack to be folded over on to itself to further reduce the size and footprint of the rack allowing for easier storage of the rack assembly when not in use. Similarly, the rack assembly 200 can use quick disconnects to break down the rack portion into smaller components.

In one exemplary embodiment, the load carrier system can include a rail assembly 300 to be mounted to the roof of a vehicle. The rail assembly 300 can be removeable mounted using any suitable means, such as fasteners or adhesives. The rail assembly 300 can include one or more rails 301 that can take any suitable shape and configuration. In one exemplary embodiment, the rail 301 can have a curvature bend that can approximate the curve of the roof of the vehicle to which the system is to be mounted. Similarly, the curvature of the rail assembly 300 can allow for easier access to the rack assembly 200 that can extend in an outwardly and downward position when in an extended position as shown in FIGS. 1A-G. In one exemplary embodiment, the curvature/arc can be about 4.5 to about 9.5 inches, or about 5.5 to about 8.5 inches, or about 7.5 inches spaced away from the top of the vehicle roof to the apex of the curvature of the rack assembly 300.

Figures 3A, 3B:
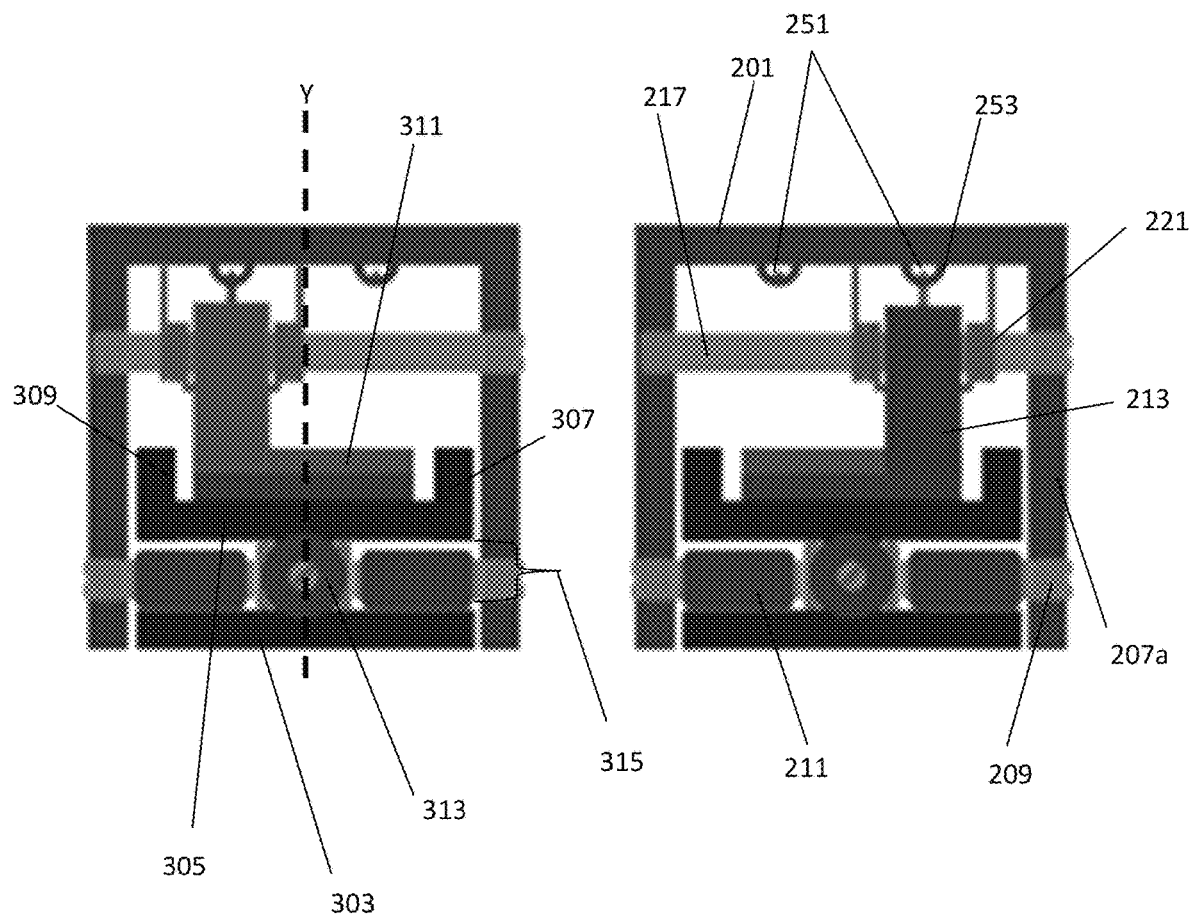
FIG. 3A is a cross-section view down plan X of an exemplary embodiment of a rail system of the load carrier system of the present disclosure of first end of a single rail and a support member.
FIG. 3B is a cross-section view of an exemplary embodiment of a rail system of the load carrier system of the present disclosure of second end of a single rail and a support member.
Figure 4:
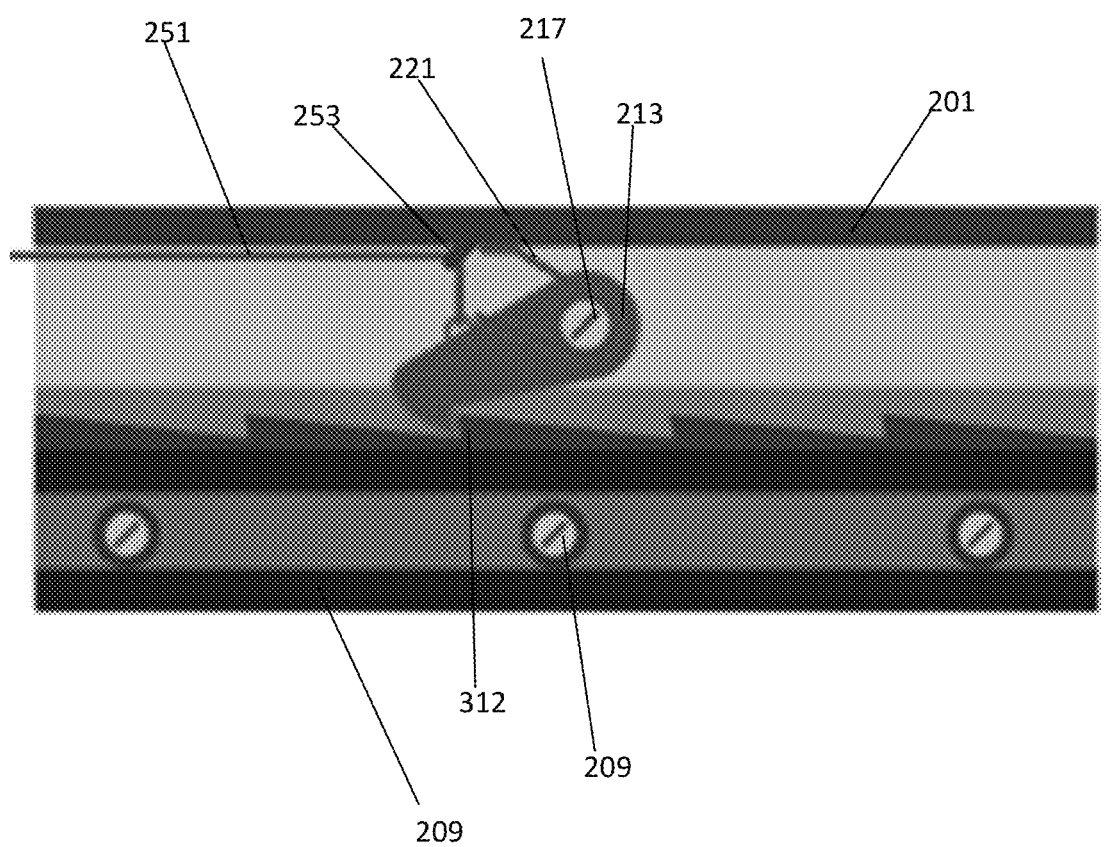
FIG. 4 is a side cross section view down plane Y of an exemplary embodiment of a rail system and latching apparatus of the load carrier system of the present disclosure.

The rail 301 can have a first side 303 and a second side 305. The first side of the rail can face a downward direction toward the roof. The sides of the rails can be flat or curved in configuration. The second side of the rail can face upward. The second side can be any suitable configuration. In one exemplary embodiment as shown in FIG. 3, the second side can be configured in a U-shaped have a first side wall 307 and a second side wall 309. In some exemplary embodiments, the two sidewalls can be a locking receiving means, such as a grooved body 311. Similarly, there can be center position portion 313 that separates the first side and second side of the rail. A configuration can take the form of I-shape, H channel, or any suitable rail configuration, wherein there is a recessed area 315 formed on each side of the center member of the rail. Each rail can have a first end 317 and a second end. In some exemplary embodiments, the grooves 312 of the grooved member 311 can be opposite between the first end 317 and the second end 319.

The recessed areas can be used to interface with a rack assembly 200. The rack assembly can comprise a first support member 201a and second support member 201b generally parallel to each other and coupled together using one or more cross-members 203. The support members 201a, b can correspond to a respective rails 301 of the rail assembly 300. The support members 201 can have a first face 205 that is generally flat in configuration. The first face can have a first end and a second end, wherein a respective first and second sidewall 207 can extend from the first end and a second side wall can extend downward generally along a vertical plane to form a u-shaped support member having an interior portion as shown in FIG. 3. Proximate to the bottom end of one or more of the side walls 207 an interfacing member 209 can extend inward from each side wall towards the center of the interior portion of the support member. The interfacing members 209 can be any suitable means. In one exemplary embodiment, the interfacing means can comprise a post having a bearing member, such as a ball bearing or a polymer roller 211 to allow for easy movement of the rack assembly along the rail system. The interfacing members 209 can interface with the recessed portions of the rails. This interfacing limits vertical movement of the rack assembly with respect to the rails, while also ensuring smooth movement of the rack assembly on the rails. In some exemplary embodiments the interfacing member and roller portion can be a single unit.

Figure 2B:
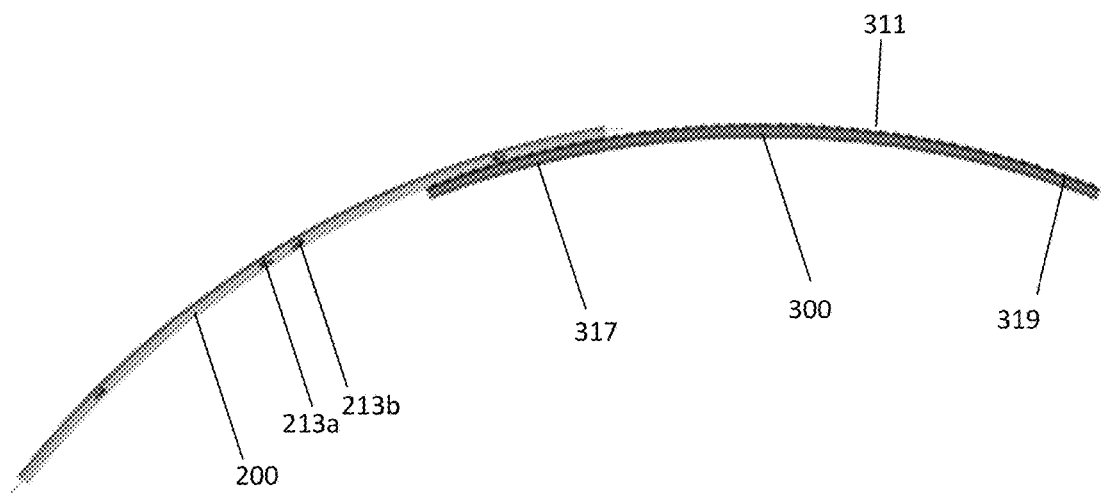
FIG. 2B is a side view of an exemplary embodiment of a retractable load carrier system of the present disclosure with the rack portion in an extended position.

Top side of the rail can include a latch engagement means 213, such as a grooved portion. The grooves of the grooved portion can engage with one or more latches of a locking means. In one exemplary embodiment, the grooves can face a first direction on one side of the rail and second direction on the other half of the rail as shown in FIGS. 2A-2B. The grooves on the first half of the rail can widen on the right and similarly, the other half of the rail can include grooves that widen to the left. As the rack assembly 200 is in motion the handle assembly 220 can engage the locking mechanism 250 either manually or by an assisted motion device such as pneumatic, piston, motor or spring. The handle assembly 220 can be attached to the locking mechanism 250 and used to engage or disengage latching engagement means 213, which can include but is not limited to one or more latches or pins mounted on the support members 201 of the rack assembly 200. The handle assembly 200 can be coupled to the locking assembly using any suitable means. In some exemplary embodiments, a cable or rod can be used to couple the locking assembly to the handle assembly.

The locking mechanism 250 can include one or more cables 251 that run to the various latches 213 or pins of the rack assembly. The cables can be supported using one or more cable guides 253. The latches or pins can be mounted within the interior portion of the support members. In some exemplary embodiments, a rotatable latch member 217 can extend between the two side walls of the support member. The latch member 217 can contain at least one latch 213 corresponding. In some exemplary embodiment, the latches on a single rotatable latch member 217 can only correspond to directional grooved 312 of the grooved body 311. A tensioning means 221, such as a spring, can be coupled to the latch or pin and cross member to maintain pressure against the latch or pin and keep the latch or pin in an "engaged" state against the grooved portion of the rail or pinion. The cables 251 can be ran through the guides 253 using cable guides. One or more cables can be connected to or coupled to the latch or pin and configured to raise the latch off of the grooved portion or retract pin from pinion when engaged by the handle assembly 220 of the rack assembly 200.

Additionally, there can be two sets of pinions latches that are offset from each other in opposite rails 301 as shown in FIGS. 2 and 3. The first set of latches pins can engage a pinion grooved members 312 corresponding to one half of the rail system, while the second set of latches is configured to engage grooved members corresponding of the other half of the rail system. In some exemplary embodiments, the rack assembly 200 can have a first end and a second end. Each end of the rack assembly can have a handle portion. The handle portion on each end can correspond to one set of the latches. The handle portion 220 on one side corresponds to the first both pins set of latches, while the hand portion on the other side also corresponds to the both pins second set of latches. When the handle portion 220b is squeezed or unlocked, as shown on one end in FIG. 5, the handle pulls a cable coupled to the various latches or pins thereby disengaging the latches or pins from the respective grooves or pinions and allowing the rack assembly to move in the direction of the respective handle portion. When the handle portion is released, the tension is supplied by one or more springs in relation to the latches or pins to engage the latches with the grooves or pins with the pinions. The opposite set of latches that do not correspond to the handle that is being engaged by the user can "skate" or "slide" over the grooves of the rail and will not impede the movement of the rack assembly along the rails.

Figure 5:
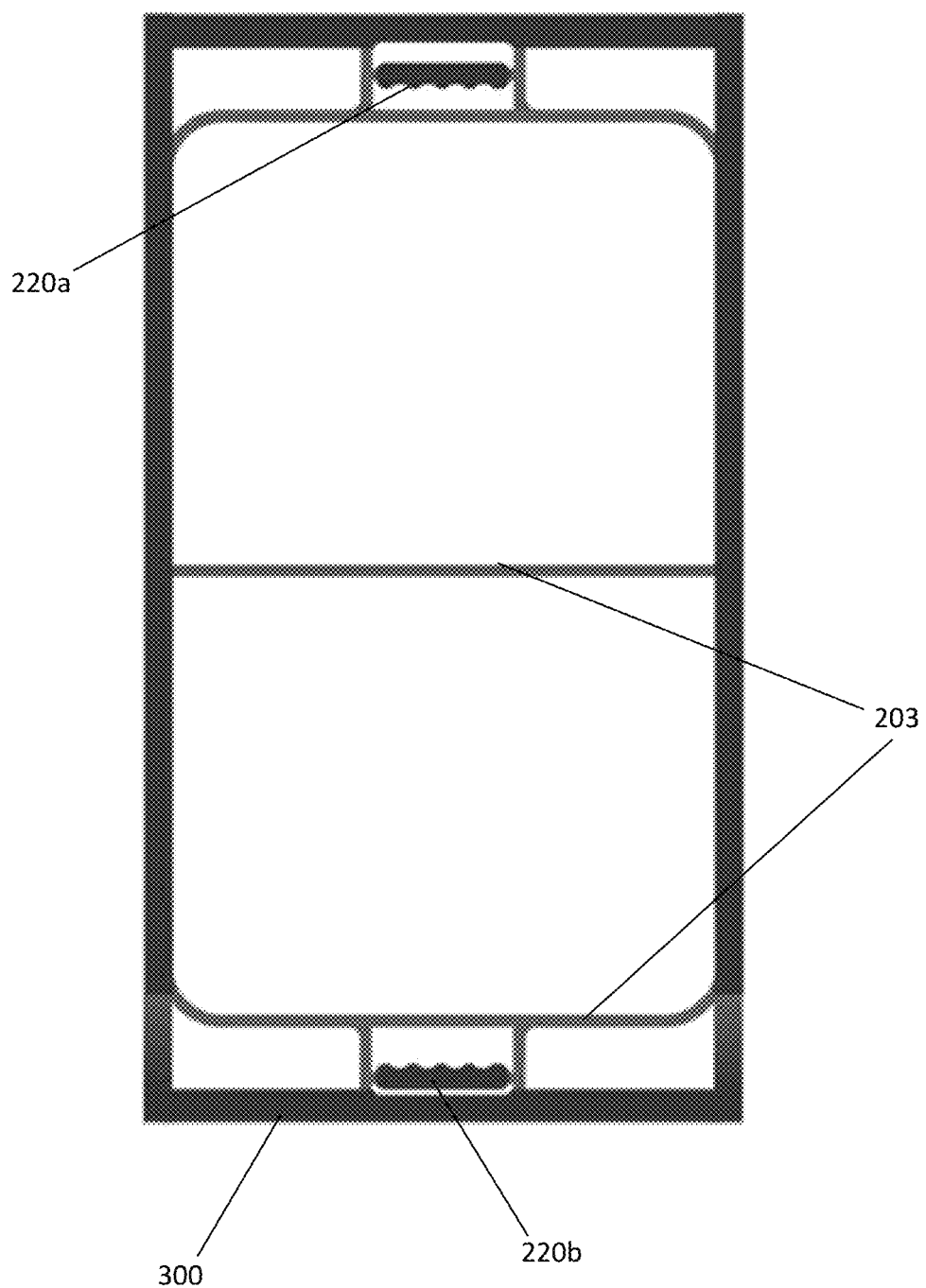
FIG. 5 is a top view of an exemplary embodiment of a retractable load carrier system of the present disclosure with the locking mechanism in the locked position on a first handle and unlocked position on a second handle.

The pinions or grooves of the rails can be spaced in predetermined intervals which allow the rack assembly to be stopped or placed in a number of positions along the curved linear rail including the retracted, up, and stored position and the fully extended position down position, shown In FIGS. 2 and 5. In the fully extended position the rack assembly will have a minimum viable amount of material remaining in the linear rail of the first part to allow for the determined weight to be supported over the side of the vehicle. A second handle on the opposite side of the rack assembly can operate in the same manner and correspond to the second set of latches or pins. At any point along the linear rail there can be a number of latch or pin assemblies configured to interface with a latch or pin when the handle is engaged. When the handle is disengaged the rack assembly can move freely along the rails.

Figure 6:
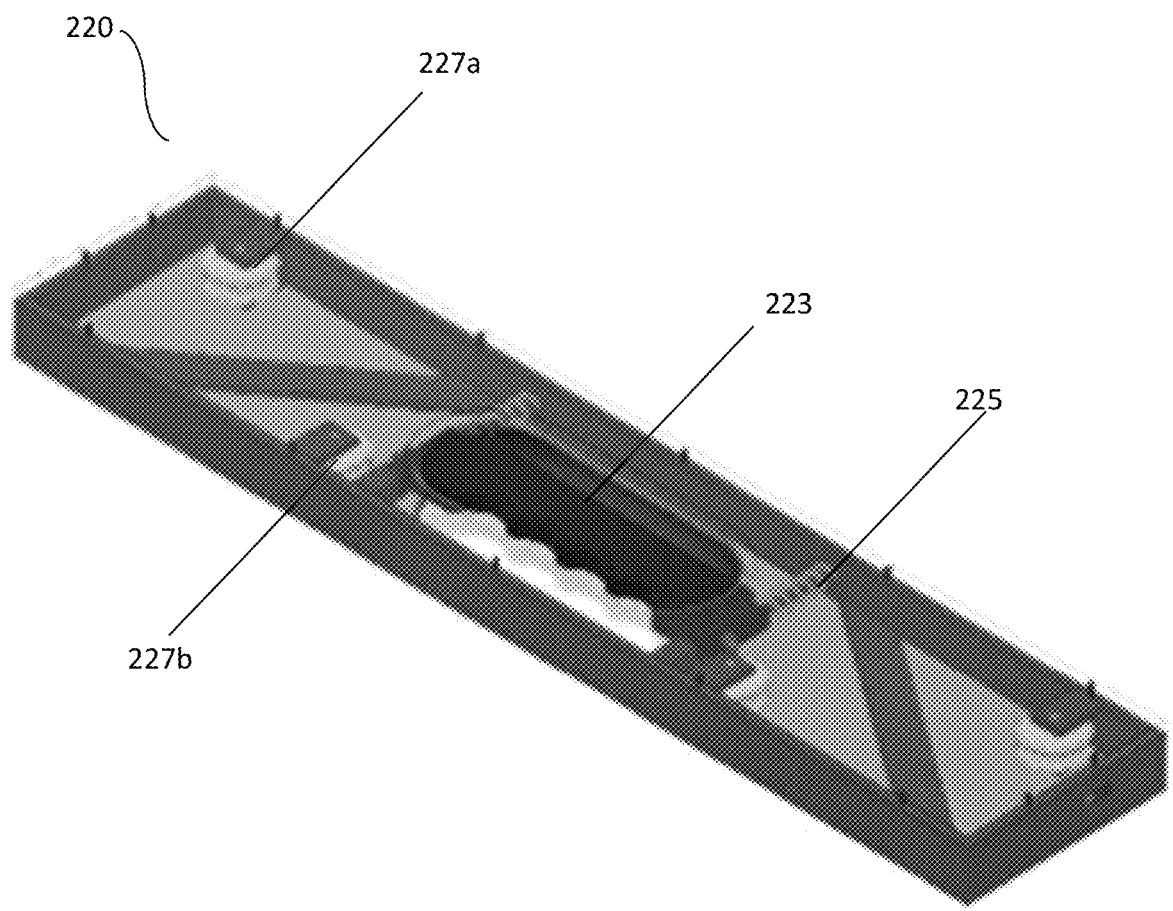
FIG. 6 is a perspective view of the handle portion and exemplary embodiment of the handle locking assembly.
Figure 7:
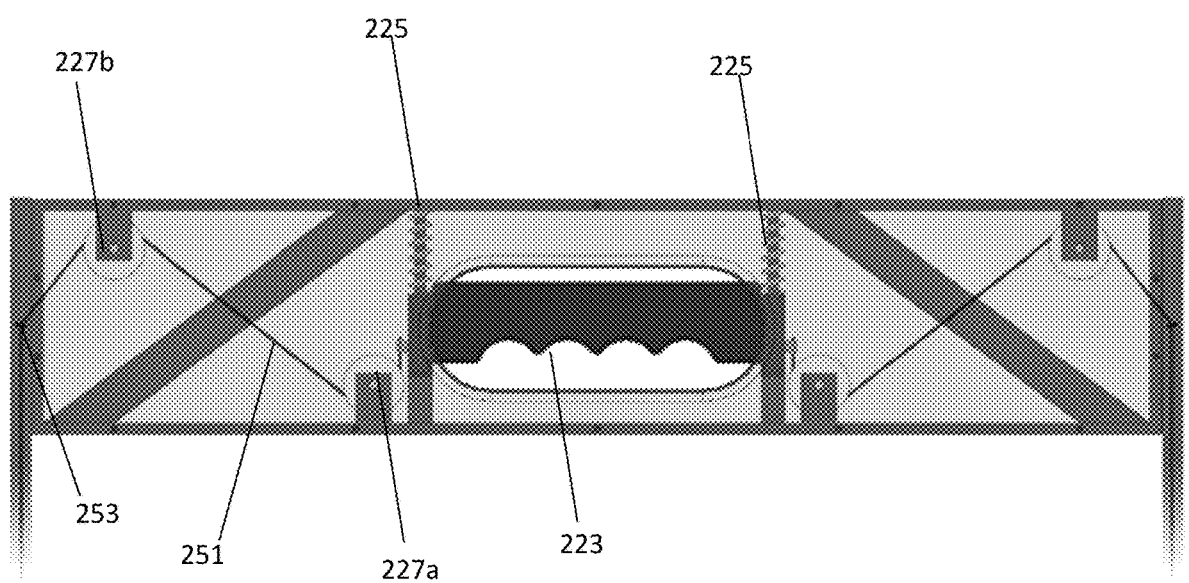
FIG. 7 is a bottom of a handle locking assembly of an exemplary embodiment of the present disclosure.
Figure 9:
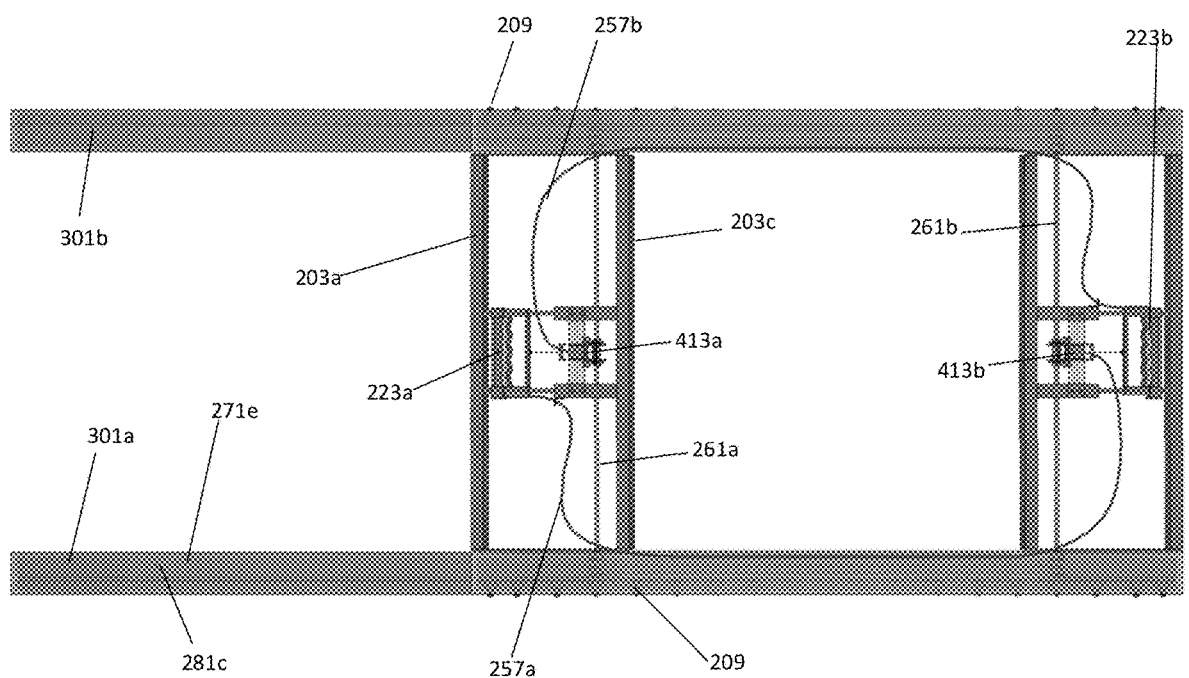
FIG. 9 is a top view of an exemplary embodiment of a retractable load carrier system of the present disclosure in a deployed position.
Figure 15:
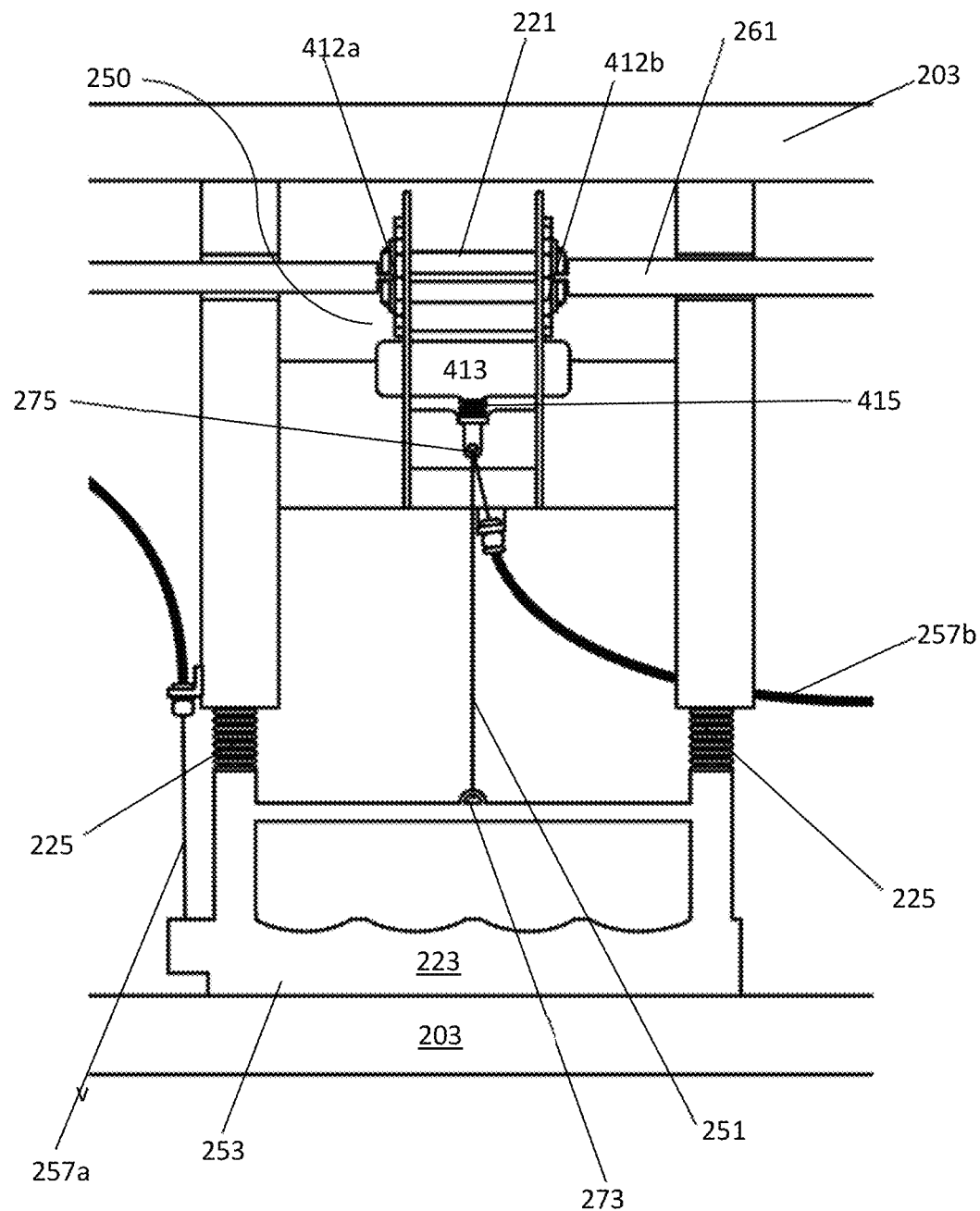
FIG. 15 is enlarged view of the handle actuator assembly of FIG. 13.

As shown in FIGS. 6, 7 and 15, some exemplary embodiments of the handle assembly 220 can include a handle portion 223 and one or more biasing apparatuses 225. In one exemplary embodiment, the biasing apparatus 225 can be a spring configured to maintain the handle portion 223 in a first position when not in engaged. In some embodiments, the first position can be a locked position. As shown in FIG. 9, some exemplary embodiments can include one or more coordinating engagement cable 257 that can allow a user to disengage the locking mechanism of both locking apparatuses 250 on each end of the rack assembly 200. This can allow a user to easily disengage the locking apparatuses 250a, b located on each end of the rack assembly on one end without the need of walking over to the other side to disengage the locking apparatus 250. When a user squeezes or applies pressure to the handle portion 223 and provides more force than that applied by the biasing apparatus 225, one or more cables 251 coupled to the handle can then disengage the locking mechanism.

Some embodiments of the handle assembly 220 can include one or more pulleys 227 to guide the cables 251 and aid in disengaging the locking mechanism. When a user releases the handle portion 223, the biasing apparatus 225 then allows the latches to reengage the rail. The pulleys 227 can allow for and provide direction to the cables 251 coupled from the handle portion to the various latches or pins. In one exemplary embodiment, the cable 251 can be coupled directly to the handle portion at a coupling end and travel through a first pulley 227b proximate to the handle and a second pulley proximate to the edge of the rack assembly 227a. A cable 251 can travel around a portion of the first pulley and through the second pulley to a guiding member 253 to guide the cable 251 up a portion of the rack assembly to the desired latch or pin 213. A second set of pulleys can be located on the other side of the handle and correspond to latches or pins on the other side of the rack assembly. This handle locking assembly can allow for multiple cables 251 to be coupled to either end of the handle portion and corresponding to the respective sides of the rack assembly and the latches or pins located on each side of the rack assembly 200.

The two curved linear rails of the rail assembly can be spaced apart at a predetermined distance from each other with supporting bars arranged between them to provide structural integrity. The rack assembly 200 can include antifriction members that are contained within the recessed areas of the rail system part which permit movement along the curved linear rail. The two curved linear rails 301 and supporting bars 201 can interface with each other using any suitable means, such as the interfacing means 209 of the rack assembly with the configuration of the rail side walls. Additionally, the rails 301 can include one or more mounting members that are pre-existing on the vehicle 10 or mounted to the vehicle to allow for easy removal of the entire rail assembly 300 and rack assembly 200.

In some exemplary embodiments, the two curved linear rails 301 can be couple to create a structure that is mounted to a vehicle roof. The linear rail 301 can utilize an antifriction member to allow the rack to extend out over the side of the vehicle when the handle portion is activated to disengage the locking means. The rack assembly 200 can then progress along the rail assembly 300 until the handle/grip 223 is released thereby reengaging the locking mechanism of the locking assembly 250. As shown in FIG. 5, the rack assembly 200 can include one or more cross members 203, that can allow a user to attach one or more items to the rack assembly 200 as well as strengthen the rigidity of the rack assembly 200. Additionally, the end of the rails 301 can include a stopping means, such as a bump stop to interface with the end portion of the support members to prevent the rack assembly from completely sliding off of the rail system. In other embodiments, a cable 271 can limit the outward mobility of the rack assembly by only having a pre-determined length of travel due to the cable length. When the handle portion 223 is released it is configured to lock the rack in motion at the next available locking position of a grooved member of the locking assembly 250.

To support movement from the up and locked starting position to extended and extended to up and locked position springs, actuators, pneumatics, and or motor(s) may be provided. In its fully extended state, the rack can be supported by at minimum two latches or pins interfacing with the pinion or grooved portion of the rails 301 can support the rack assembly 200 and any contents supported by the rack assembly 200. In one exemplary embodiment, each rail 301 can have a single latching or pin interfacing point for a total of two latching or pin interfacing points between the two rails. From one mounting position with no reconfiguration or re-mounting the rack movement can extend over the vehicle horizontally over both sides of the vehicle by utilizing the attached handles. In one exemplary embodiment, there can be a handle portion 220 on both sides of the rack assembly 200 to allow a user to move the rack assembly to extend over either side of the vehicle. In some alternative embodiments, the first a second support members can be separate and not coupled together to allow for individual use of each individual support member corresponding with the rail of the rail assembly.

Figure 8:
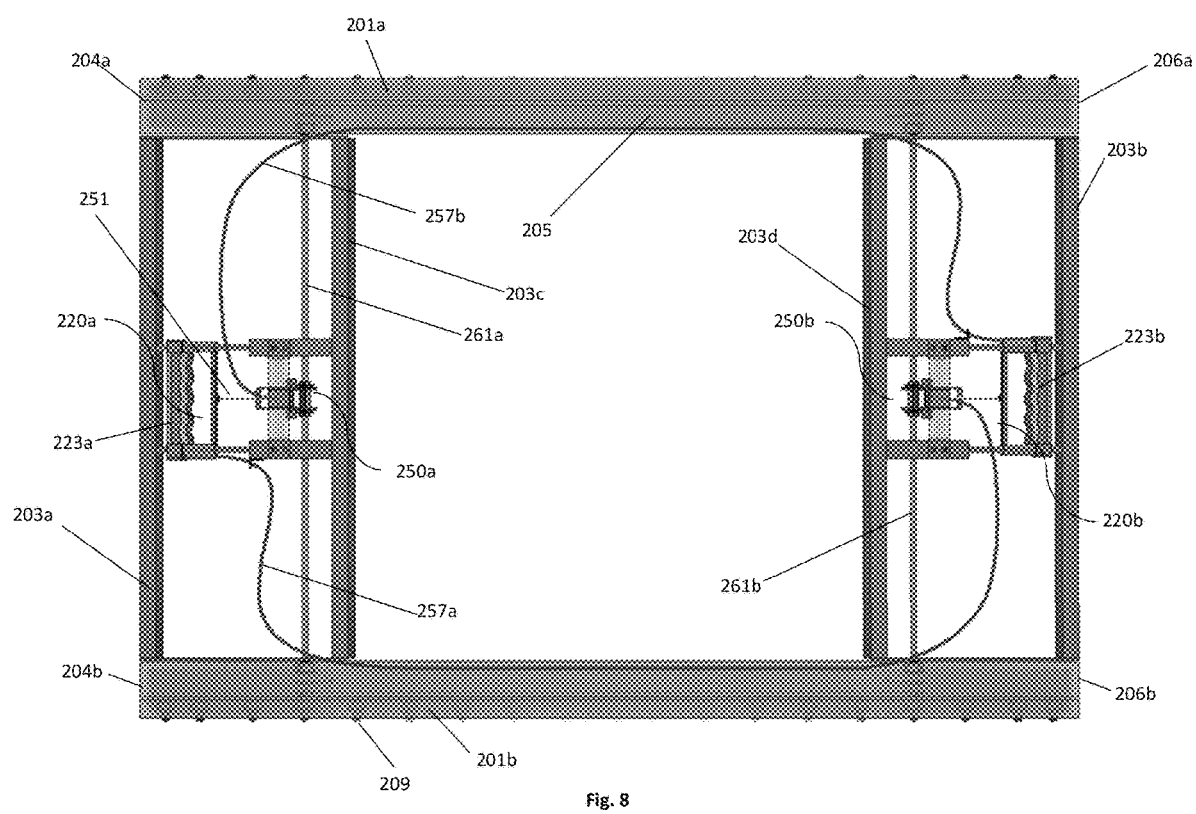
FIG. 8 is a top view of an exemplary embodiment of a retractable load carrier system of the present disclosure in an undeployed position.

FIG. 8 illustrates an exemplary embodiment of a rack assembly 200 that can include a first support member 201a and a second support member 201b. The two support members 201 can be coupled together with one or more cross members 203. In some exemplary embodiments, the cross members 203 can additional be used to support the locking mechanism 250 and handle portion 220 of the rack assembly 200.

As shown in FIGS. 8, 9 and 12-15 some exemplary embodiments of the handle assembly 220 can include a handle portion 223 and one or more biasing apparatuses 225. In one exemplary embodiment, the biasing apparatus 225 can be a spring configured to maintain the handle portion 223 in a first position when not in engaged by a user. In some embodiment, the first position can be unengaged or locked position. When a user squeezes or applies pressure to the handle portion 223 and provides more force than that applied by the biasing apparatus 225, one or more cables 251 coupled to the handle can then disengage a locking mechanism of the locking assembly 250. In some exemplary embodiments, the mechanism can include on or more engagement members or latches 213 to allow a user to easily move the rack into various positions. The engagement members 413 can interface with a grooved member 412 to lock the rack assembly into a desired position. When a user releases the handle portion 223, the biasing apparatus 225 then allows the latches 413 to reengage the grooved member 412. Additionally, the handle locking assembly 220 can include one or more pulleys.

In one exemplary embodiment, the locking mechanism can be a ratchet latch 250 that can include a tension bar 261. The tension bar 261 can span between each of the support members 201 as shown in FIG. 8. The bar can have a first 262 end and a second end 264. The tension bar 261 can be set to a certain level of compression or tension using one or more tensioning means, such as a spring. In some exemplary embodiments, the tensioning means 221 can operate as a lift assist by maintaining a tension on the 261 to aid a user when moving the rack assembly 200 from a first position to a second position on the rail assembly 300. In some exemplary embodiments, the tension bar 261 have one or more spool apparatuses 263. In some exemplary embodiments, the tension bar can have two spool apparatuses on each end or a single apparatus on each end. As shown FIG. 13, on each end of the tension bar 261 can at least one cable spool apparatuses 263 configured to store on or more tension cables 271 coupled to the support members and the spool apparatus 263. One end of the cable 271 can be coupled to the spool apparatus 261 and the other end of the cable can be coupled to the corresponding rail 301. Some of the cables 271 can similarly be coupled to a corresponding spool member on the opposing bar 261. In some exemplary embodiments, the cables 271 on the spool apparatus 263 can be under a pre-determine amount of tension that can aid a user in moving the rack assembly from a first to send position. The cables 271 running between to spool apparatuses can operate as a tensioning means 221 in some exemplary embodiments.

In other embodiments, the bar may not under a tension. As shown in FIG. 15, the bar 261 can include a plurality of spool apparatuses 263. Each cable spool apparatus 263 can contain a cable 271 within the spool to assist with the movement of the rack assembly 200. The tension cable 271a on one of the spool apparatuses 263 can be coupled proximate to the first end of a rail 301, and the second tension cable 271b can be coupled proximate to the second end of same rail 301. In some exemplary embodiments, the coupling ends 281 can be located on the corresponding rails 301 of the rail assembly. When the support member is moved along the rail assembly, the cables 271a,b operate converse to each other were the first spool will coil up the first tension cable while the other tension cable is withdrawn from the spool and visa versa depending upon which side the rack assembly is deployed. Similarly, the cables can be set at a pre-determined length so as to limit the range of motion of the rack assembly on top of the rail assembly and prevent the rack assembly from sliding off of the rail assembly. In some exemplary embodiments, a third cable 271b can run continuously from a second spool 263b on the first bar 261 to a second spool 263f on the second bar 261b.

It should be understood that in certain embodiments, one side of the rack assembly may utilize two cables for controlling the motion and distance of travel of the rack assembly. These cables 271 are cables that are coupled to a spool apparatus on one end and then coupled to a point on the corresponding rail 301 on the other end. While the other side of the rack assembly may include one or more cables for maintaining tension on the bar. The tensioning cables can be cables that can run continuously from a spool apparatus on one end of a support member to a spool apparatus on the second end of the support member and corresponding tension bar. It should also be understood that one or more variations of the locations of the distance cables and tensioning cables can be interchanged between the various spool apparatuses. In one exemplary embodiment illustrated in FIG. 13, the rack assembly can have two tensioning cables 271b, g and four distance cables 271a,c,e,f. The distance cables 271a, c,d,e,f can be coupled to their corresponding spool member 263a,c,e,g on one end and to a portion on the opposite end of the adjacent rail assembly. In some embodiments, one or more distance cables 271 can be coupled below the spool apparatus of the rack assembly 200 to the rail 301 proximate to the spool apparatus 263.

As shown in FIGS. 14-17, the locking apparatus 250 can include one or more grooved members 412 that can interface with a latch 413. The grooved members 412 can be coupled to the tension bar 261. In some exemplary embodiments, the grooved members can be generally circular and approximate the diameter of the tension bar 261. When the latch 413 is disengaged from the grooved members 412 the tension bar is can turn freely within the locking apparatus 250 and thereby allowing the rack assembly to move freely from a first position to a second position. Additionally, in some exemplary embodiments, a latch biasing means 415, including but not limited to a spring can be used to maintain pressure between the latch 413 and one or more grooved members 412.

Figure 11:
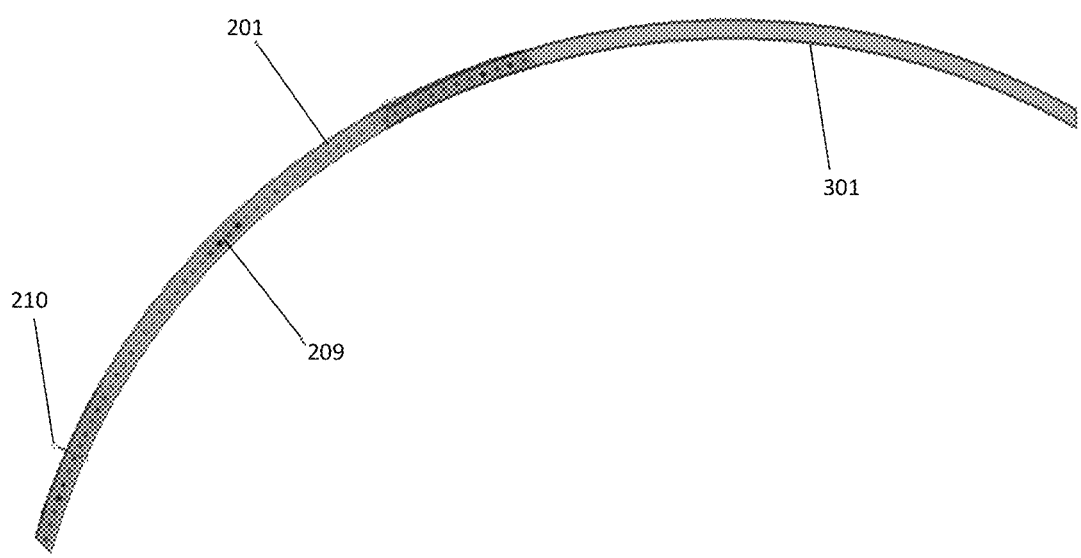
FIG. 11 side view of an exemplary embodiment of a retractable load carrier system of the present disclosure in a deployed position.
Figure 12:
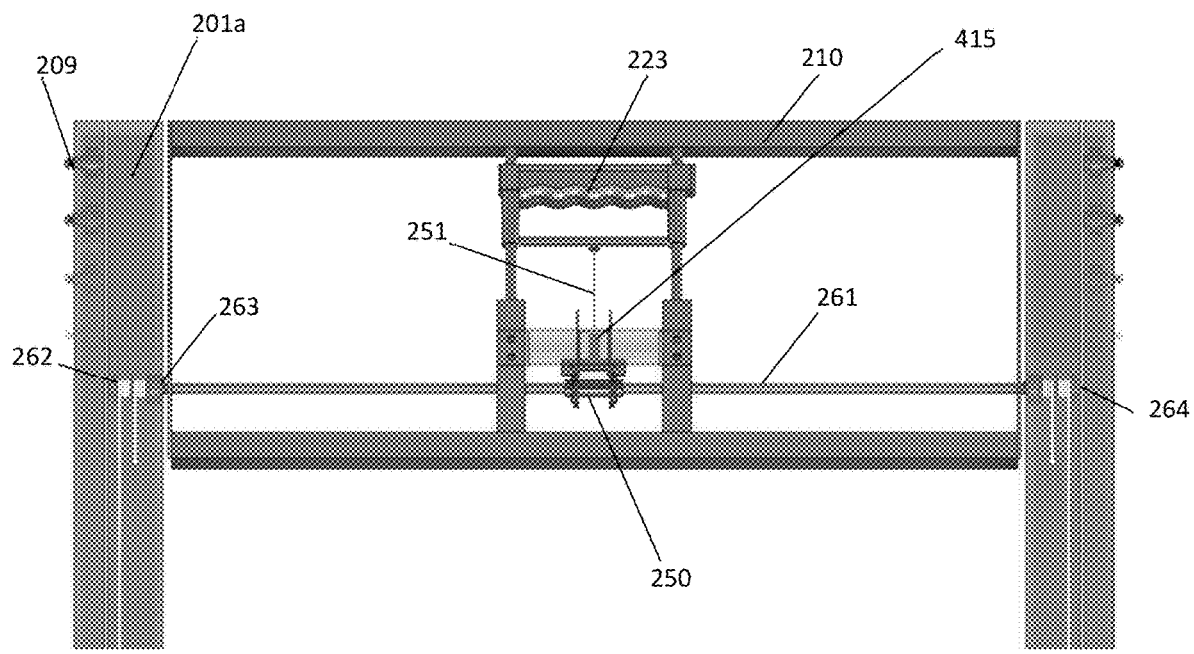
FIG. 12 is top view of an exemplary embodiment of a handle actuator assembly of a retractable load carrier system of the present disclosure on the rail assembly.

As shown in FIG. 8, an exemplary embodiment of the present disclosure can include a first support member 201a and a second support member 201b. Each support member can have a first end 204 and a second end 206. One or more cross members 203 can be coupled generally perpendicularly to the support members 201 to connect the two support members. In some exemplary embodiments, the cross members can act as racking points for attaching objects to the rack assembly 200. In some exemplary embodiments, a first cross member 203a can couple the two support members at the first end 204a, b and second cross member 203b can couple the support members 201a,b at the second end 206a,b. Further, in some exemplary embodiments, the cross members 203 can provide a mounting point for one or more handle assemblies 220 and locking assemblies 250. One or more additional cross members 203c, d can be position and coupled between the support members 201a predetermined distance from the first end and/or second end. Additionally, the one or more cross-members 203 can include an additional rack portion 210 for coupling items or loads to the rack assembly. The rack portion 210 can extend generally upward from the cross member 203 as shown in FIG. 11.

Figure 17:
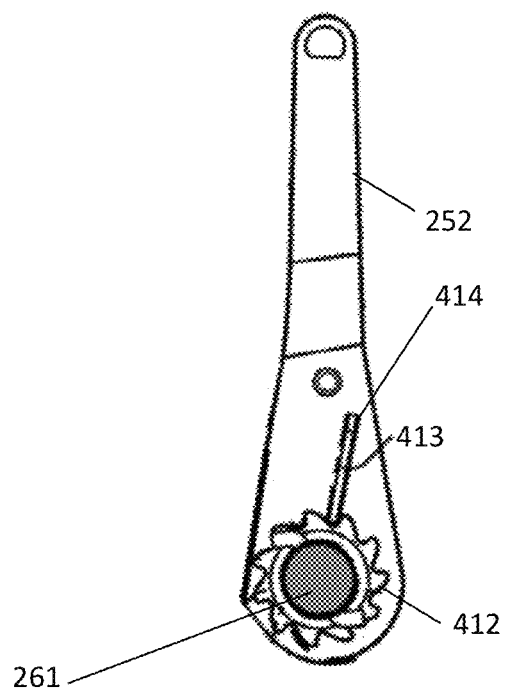
FIG. 17 is a side view of an exemplary embodiment of a locking apparatus of the present disclosure.

As shown in FIG. 8, some exemplary embodiments of the present invention can a handle assembly 220a, b and locking assembly 250a,b can be positioned proximate to each of the cross members 203a,b. The handle assembly 220 can include a handle or grip portion 223 and a couple means 251 to the locking assembly 250. Additionally, one or more biasing means 225, such as but not limited a spring can be used to maintain the handle assembly 220 in a first position, such as a locked position. The first end of the rack assembly 200 can have a first handle assembly 220a and a first locking assembly 250a and the second end of the rack assembly can have a second handle assembly and a second locking assembly. In some exemplary embodiments, a cable 251 can be coupled between the handle assembly 220 and the locking assembly 250. The cable 251 can be coupled to the handle/grip 223 at one or more coupling ends 273 as shown in FIG. 15. Additionally, the other end of the cable 251 can be coupled to a coupling end 275 of the locking assembly 250. The coupling end 275 can be proximate to and/or communicatively coupled to a latch or stopping member 413 of the locking assembly 250. When a user applies pressure to the grip 223, the cable 251 will pull the latch 413 up from and disengage the latch from one or more grooved members 412 of the locking assembly 250. This can allow a bar 261 to rotate freely, thereby allowing the rack assembly to move. In some exemplary embodiments, the bar 261 can be a tension bar. Additionally, the bar 261 can pass through and be coupled to one or more grooved members 412 of the locking assembly 250 as shown in FIGS. 15 and 17. The locking assembly 250 can have a body or frame 252 to house a latch 413 that can be located within one or more slots 414 of a sidewall of the frame 252. The slot can allow the latch 413 to move up and down from a first position to a second position within the frame 252.

The handle assembly 220 and locking assembly 250 can further utilize one or more additional support frames to couple the respective assemblies to the rack assembly 200. Additionally, some exemplary embodiments can utilize one or more coordinating engagement cables 257. A first end of a first coordinating engagement cable 257a can be coupled to the first hand portion 223a of the rack assembly 200. The second end of the first coordinating engagement cable 257a can then be coupled to the latch 413b. The coordinating engagement cable 257 allows the user to simultaneously unlock/disengage the latches 413 of the respective locking assemblies to thereby allow the rack assembly to slide in either direction on the rail assembly 300. Similarly, the first end of a first coordinating engagement cable 257b can be coupled to the second hand portion 223b of the rack assembly, wherein the second end of the engagement cable 257b can be coupled to the latch 413a of the first locking assembly 250a.

As shown in FIG. 17, some exemplary embodiments of the bar 261 of the locking assembly 250 can further include one or more spool members 263. In some exemplary embodiments, the spool members 263 can be located on each end of the bar withing the side walls 207 of the support member 203. The spool members 263 can be located on both the first end and second end of the bar 261. One or more spool members can be used to store cable 271. The cable 271 can be spooled on the spool member 263. When the rack assembly is being moved from a first position to a second position, the spool cables 271 can coil and uncoil according to the direction the rack assembly is traveling. In some exemplary embodiments, each bar 261a,b can have a first spool member 263a and a second spool member 263b on each end of the bar 261 as shown in FIG. 14.

Figure 13:
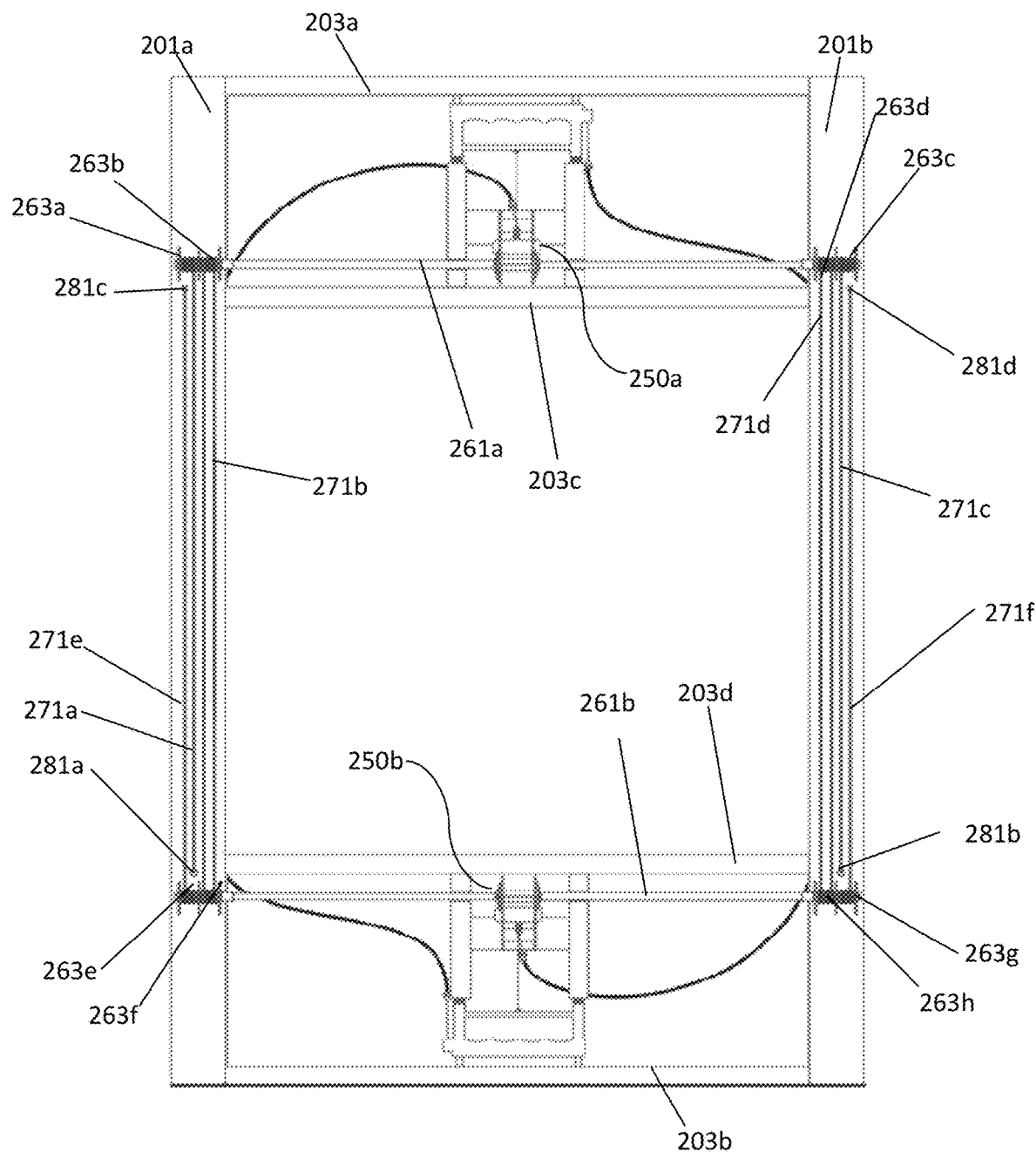
FIG. 13 is a bottom view of an exemplary embodiment of rack assembly of a retractable load carrier system of the present disclosure.
Figure 14:
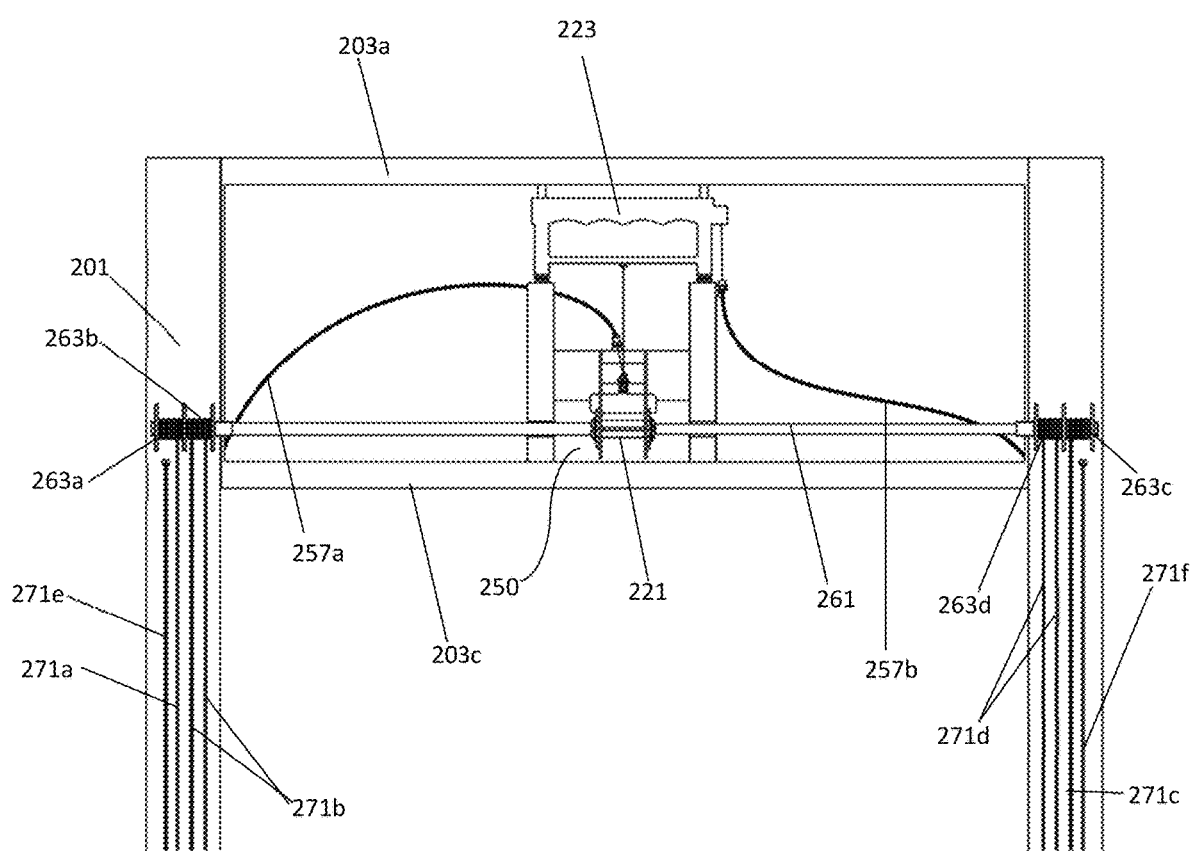
FIG. 14 is a bottom view of an exemplary embodiment of a handle actuator assembly of a retractable load carrier system of the present disclosure.

Additionally, each bar member 261a,b can have a third and a fourth spool member 263c,d as shown in FIG. 13-14. Each spool member 263 can be communicatively coupled to a cable 271. In some exemplary embodiments, the first end of the cable can be coupled to the corresponding rail 301 proximate to the spool member, and the second end of the cable can be coupled to the spool member 263. In some embodiments, the first end of the second cable 271b can be couple to a spool member on the adjacent corresponding bar 261b of the other locking assembly 250b, as shown in FIG. 13. In some exemplary embodiments, a first cable 271a can be coupled to a portion of a first spool member 263a and coupled to the rail 301 at a coupling end 281a. A second cable 271b can be coupled to a second spool member 263b on one end an coupled to a second spool member 263f on the adjacent bar 261b, or alternatively cable 271b can be continuously ran between the two spool members 263b and 263f, wherein the continuous cable run between the two spools can further provide tension to the respective bars 261a,b.

Optionally, one or more of the bars 261a,b can include a third spool member that can have a third cable 271c wherein one end of the cable is coupled to the third spool member 263c and the other end of the cable is couple to a rail 301 at a coupling end 281b on a correspond rail as shown in FIG. 9. Similar to the other support member, a bar 261a can have a fourth spool member 263d with a first end of a fourth cable 271d coupled to the spool member and the second end of the cable 271d coupled to a corresponding spool member 263h on the adjacent bar 261b. In some alternative embodiments, the fourth cable 271d can be continuously run between the fourth spool member 263d of the first bar 261a and the fourth spool member 263h of the second bar 261b as shown in FIG. 13. The cables 271b and 271d that run from spool to spool on can operate as a tensioning means for the bar 261 by maintaining the tension on the cable while the rack assembly is moved from a first position to a second position. The second bar 261b can similarly include additional spool members 263e,g that can include a respective cable 271e,g, wherein the first end of each of the cables is coupled to the respective spool member and the second end of the cable is coupled to a respective coupling end 281c,d to the respective rails 301. The coupling ends 281 can couple to the rails on the opposite end of the rail from the corresponding spool 263, as shown in FIGS. 9 and 13.

Figure 10:
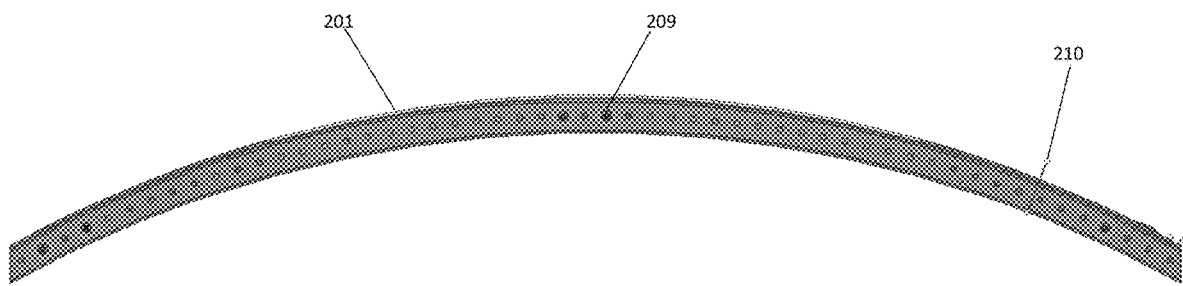
FIG. 10 is a side view of an exemplary embodiment of a retractable load carrier system of the present disclosure in an undeployed position.
Figure 16:
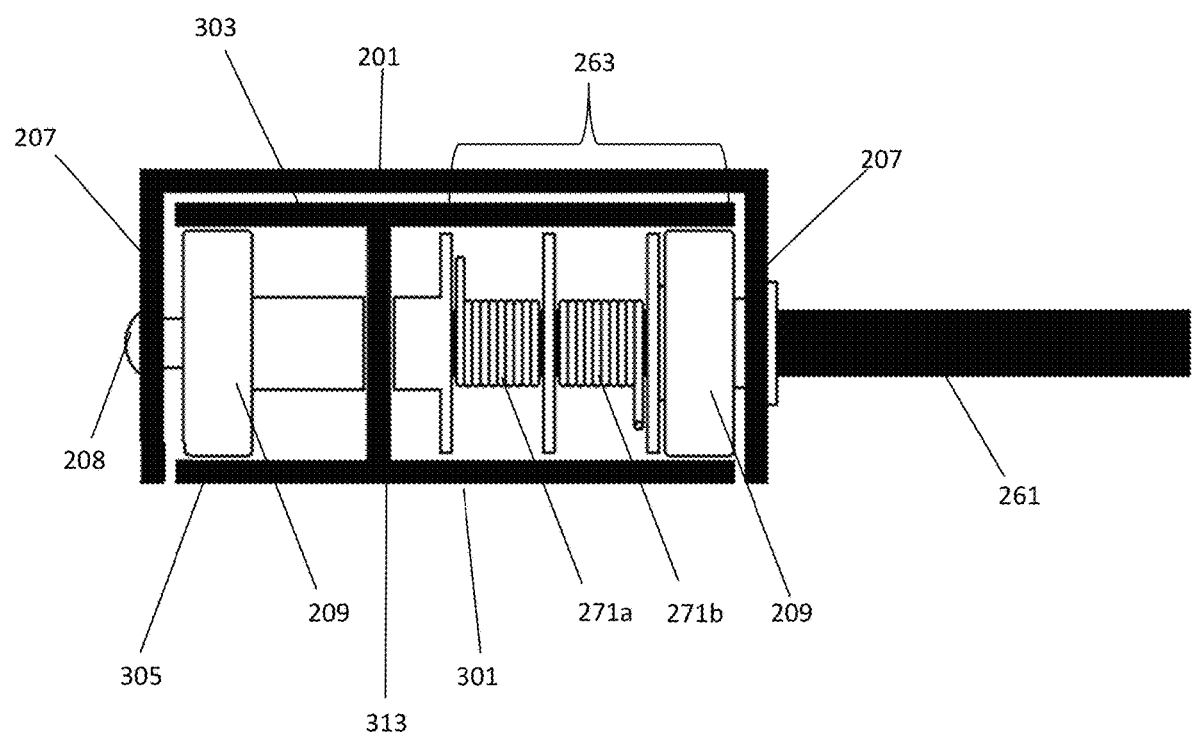
FIG. 16 is a side view of a rail of a rail assembly and support member of a rack assembly.

As shown in FIGS. 10, 11, and 16, some exemplary embodiments, a first sidewall 207 of the support member can include a first interfacing member 209 that can extend generally perpendicular from the sidewall into the rail assembly 300. The interfacing member 209 can be round a spin freely to allow the rack assembly to interface with the rail assembly and move smoothly in either direction. In some exemplary embodiments the interfacing member 209 can be a wheel 209 or bearing and can be couple to the sidewall 207 using any suitable means, such as a fastener 208. In some exemplary embodiments, the wheel or bearing can include an antifriction coating, such as fluorinated ethylene propylene (FEP). A spacer 214 can be utilized to help maintain the interfacing member between the top 303, bottom 305, and center portion 313 of the rail. Similarly, in some exemplary embodiment the bar 261 can include one or more interfacing members 209 on the other side of the center portion.

To support movement from the up and locked starting position to extended and extended to up and locked position springs, actuators, pneumatics, and or motor(s) may be provided. In its fully extended state, the rack can be supported by a at least one cable coupled to the bar, which can be locked by the locking mechanism 250. A latch 413 can interface with the grooved member 412 of the locking assembly 250 that can support the rack and any contents supported by the rack. From one mounting position with no reconfiguration or re-mounting the rack movement can extend over the vehicle horizontally over both sides of the vehicle by utilizing the attached handle assembly 220. In one exemplary embodiment, there can be a handle portion 220 on both sides of the rack assembly 200 to allow a user to move the rack assembly to extend over either side of the vehicle. In some alternative embodiments, the first a second support members can be separate and not coupled together to allow for individual use of each individual support member corresponding with the rail of the rail assembly.

The present disclosure provides a retractable load carrier system that allows for easy removal of the cargo place on the rack assembly and allows for the carrying of payload in excess of about 100 pounds. The apparatus of the present disclosure can be adapted to conform to a user's needs and can include weight capacity ranges depending upon the application. Similarly, the size and dimensional aspects should not be considered limiting as they can be adjusted to conform to the desired vehicle application.

It will be understood that the invention disclosed and defined in this specification extends to all alternative combinations of two or more of the individual features mentioned or evident from the text or drawings. All of these different combinations constitute various alternative aspects of the invention.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A retractable load carrier apparatus for a vehicle roof comprising:
   a rail system having a first rail and a second rail, wherein said rails are configured to be mounted to a vehicle roof; and
   a rack assembly comprising:
      a first support member and second support member, wherein each support member has a first end and a second end and the first rail corresponds to the first support member and the second rail corresponds to the second support member;
      a first cross member coupled to the first and second support members at the first end of the support members and a second cross member coupled to the first and second support members at the second end of the support members;
      a first handle assembly coupled to the first cross member, wherein the handle assembly comprises a grip and a biasing means to maintain the grip in a first position; and a first locking assembly communicatively coupled to the first handle assembly, wherein the locking assembly is configured to be disengaged when pressure is applied to the grip and moved from the first position to a second position to allow the rack assembly to move from a first position to a second position.

2. The apparatus of claim 1, wherein the system further comprises a second handle assembly coupled to the second cross member, wherein the handle assembly comprises a second grip and a biasing means to maintain the grip in a first position.

3. The apparatus of claim 2, wherein the first locking assembly comprises a latch and a grooved member, wherein the latch engages with the grooved member when the grip is in the first position and disengages with the grooved member when the grip is in the second position.

4. The apparatus of claim 3, further comprising a first coordinating engagement cable having a first end and a second end, wherein the first end of the first coordinating engagement cable is couple to the grip of the second handle assembly and the second end is couple to the first locking assembly, wherein when the second grip is moved from the first position to the second position, the first locking assembly is configured to be disengaged to allow the rack to move from a first position to a second position.

5. The apparatus of claim 4, further comprising a second locking assembly communicatively coupled to the second handle assembly, wherein the locking assembly is configured to be disengaged when pressure is applied to the grip and moved from the first position to a second position to allow the rack assembly to move from a first position to a second position on the rails.

6. The apparatus of claim 5, further comprising a second coordinating engagement cable having a first end and a second end, wherein the first end of the second coordinating engagement cable is coupled to the grip of the first handle assembly and the second end is couple to the second locking assembly, wherein when the second grip is moved from the first position to the second position, the first locking assembly is configured to be disengaged to allow the rack to move from a first position to a second position.

7. The apparatus of claim 6, wherein the first support member and second support member further includes one or more interfacing members configured to interface the with the corresponding rail and allow the rack assembly to move along the rails when the locking assemblies are disengaged.

8. The apparatus of claim 7, wherein the each locking apparatus further comprises a bar having a first end and a second end, wherein the bar is coupled to the grooved member, wherein the bar extends between the two support members of the rack assembly.

9. The apparatus of claim 8, wherein the bar further comprises a first spool member on the first end and a second spool member on the second end.

10. The apparatus of claim 9, wherein each spool member houses a cable having a first end and a second end, wherein the first end of the cable is coupled to the spool member and the second end of the cable is couple to a rail.

11. The apparatus of claim 10, wherein the bar is under a pre-determined amount of tension, wherein the tension on the cable is configured to aid a user to move the rack assembly from a first position to a second position when a load is placed on the rack assembly.

12. The apparatus of claim 11, wherein the locking assembly further comprises a biasing means configured to maintain engagement of the latch with the grooved portion.

13. The apparatus of claim 12, wherein the bar further comprises a interfacing member configured to interface the rack assembly with the rail assembly, wherein the interfacing member is a wheel configured to allow the rack assembly to freely travel along the rail assembly when the locking assembly is disengaged.

14. A retractable load carrier apparatus for a vehicle roof comprising:
a rail assembly comprising a first rail and a second rail, wherein each rail is configured to be mounted to a vehicle roof;
a rack assembly comprising a first support and the second support member parallel to each other, wherein the first support member and second support member are coupled together with at least one cross member, wherein the rack assembly has a first end and a second end, wherein both the first and second end include a handle portion comprising biasing means to maintain a first position; and a locking assembly communicatively coupled to each handle portion of the rack assembly, wherein the locking assembly comprises at least one latch, wherein the latch is configured to engage a groove portion of the locking assembly.

15. The apparatus of claim 4, further comprising a handle locking assembly having a handle portion, a biasing apparatus wherein the handle portion is communicatively coupled to the locking assembly.

16. The apparatus of claim 5, wherein each support member has one or more interfacing members configured to interface the rack assembly with the rail, wherein the interfacing members are round and further configured to allow the rack assembly to roll along the rail assembly.

17. The apparatus of claim 5, wherein the biasing means is configured to maintain the handle portion in a first position and wherein a user applies a force greater than the force of the biasing means moves the handle into a second position.

18. The system of claim 6, wherein the first position of the handle portion corresponds to an engaged position of the latch, and the second position of the handle portions corresponds to a disengaged position of the latch.

19. The system of claim 7, wherein the locking assembly further comprising a tension bar having a first end and a second end and is coupled to the grooved member, wherein the tension bar spans between the first support member and the second support member.

20. The system of claim 10, wherein the tension bar further comprises at least on first cable spool apparatus on the first end and second cable spool apparatus on the second end, wherein the cable spools are configured to store one or more tension cables.

* * * * *